US006430541B1

(12) United States Patent
Brown et al.

(10) Patent No.: US 6,430,541 B1
(45) Date of Patent: Aug. 6, 2002

(54) MANAGING INVENTORY PURCHASES

(75) Inventors: Michael Wayne Brown, Georgetown; Kelvin Roderick Lawrence; Michael A. Paolini, both of Round Rock, all of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/560,319

(22) Filed: Apr. 28, 2000

(51) Int. Cl.$^7$ ............................................... G60F 17/60
(52) U.S. Cl. ........................................ 705/28; 705/29
(58) Field of Search ................................. 705/28, 29

(56) References Cited

U.S. PATENT DOCUMENTS

| | | |
|---|---|---|
| 4,882,724 A | 11/1989 | Vela et al. |
| 4,992,940 A * | 2/1991 | Dworkin ............... 705/26 |
| 5,691,684 A | 11/1997 | Murrah |
| 5,798,694 A | 8/1998 | William et al. |
| 5,969,606 A | 10/1999 | William et al. |
| 5,983,200 A | 11/1999 | Slotznick |
| 6,204,763 B1 * | 3/2001 | Sone ..................... 340/568.1 |

FOREIGN PATENT DOCUMENTS

JP 10-105078 * 4/1998

OTHER PUBLICATIONS

"Nutrition software helps weight conscious PC users plan and stick to diets" by Don Trivette, PC Magazine, Oct. 16, 1990, v9 n17, pp. 557–558.* iButton Overview, Mar. 2, 2000 "What's the Java–powered Ring?".

* cited by examiner

Primary Examiner—Kenneth R. Rice
(74) Attorney, Agent, or Firm—Marilyn Smith Dawkins; Bracewell & Patterson, L.L.P.

(57) ABSTRACT

In accordance with the present invention, absent items from an intended inventory are monitored at a computer system. Search requests for the absent items are automatically transmitted from the computer system to multiple independent product databases each respectively associated with one of multiple retailers. Offers are returned from multiple retailers to the computer system, such that inventory purchases for the particular household are managed by the computer system.

42 Claims, 8 Drawing Sheets

| Absent Items | Amount Range | Schedule Range | Budgetary Preference | Brand Preference |
|---|---|---|---|---|
| Pickles | 12 oz-64 oz | 01/20/2000-01/30/2000 | $4.00 | Brand A |
| Spatula | slotted | 01/20/2000-01/21/2000 | $5.00 | Brand X |
| • | • | • | • | • |
| • | • | • | • | • |
| • | • | • | • | • |
| Fish A | 2 pound | 01/20/2000-01/21/2000 | $10.00 | any |
| Chocolate Ice Cream | 1 gallon | 01/20/2000-01/25/2000 | $3.00 | any |

| Item Preference | Brand Preference? | Retailer Preference? | Automatic? | Amount Cap | Schedule Cap | Budget Cap |
|---|---|---|---|---|---|---|
| Firewood | None | None | Yes | 40 bushels | 10/01/2000-02/01/2001 | $3.00 per bushel |
| • | • | • | • | • | • | • |
| • | • | • | • | • | • | • |
| • | • | • | • | • | • | • |
| Frozen Waffle | Eggo™ | None | Yes | 3 boxes | None | $1.00 per box |
| Any Fish | None | Retailer Z | No | | | |

MANAGING INVENTORY PURCHASES

CROSS-REFERENCE TO RELATED APPLICATIONS

The present application is related to the following co-pending applications, which are filed on even date herewith and incorporated herein by reference:

(1) U.S. patent application Ser. No. 09/560,386, entitled "MANAGING AN ELECTRONIC COOKBOOK" and filed Apr. 28, 2000; and (2) U.S. patent application Ser. No. 09/560,320 entitled "MANAGING HOME INVENTORY" and filed Apr. 28, 2000.

BACKGROUND OF THE INVENTION

1. Technical Field

The present invention relates in general to an electronic market and, in particular, to a method, system, and program for managing inventory purchases. Still more particularly, the present invention relates to a method, system and program for improving efficiencies in cost and time for inventory purchases according to inventory needs.

2. Description of the Related Art

Many retailers are now providing on-line store services via a web site where the user can search for products according to multiple types of criteria, such as by name or by category. These on-line stores may even provide for a user to register with the web site and provide product preferences. For example, a user may register with a web site for food-related products and include a preference for fresh pineapple by a particular fruit provider.

However, while on-line store services may be queried according to criteria designated by the user, typical on-line store services function independent of one another. Therefore, comparisons of prices for a product available at multiple on-line stores must typically be performed by a bot (short for robot) program that searches multiple web sites for a particular product and stores the responses in databases or an automatic record-keeping system. Multiple bot applications are now accessible at on-line search engines, such as yahoo.com and lycos.com. In addition, local bot applications that function on a user's local computer are provided, such as a shopbot described in an International Application with International Publication Number WO 98/32289, where multiple on-line stores are queried with specific query data from a locally operating shop bot application.

In addition, while comparison shopping between on-line stores may be performed by an on-line search engine or locally functioning bot application, in the area of home inventory management, typical on-line store services do not monitor inventory that is needed for a particular home according to meal plan schedules, seasonal inventory preferences, food inventory preferences of occupants of the home, etc. In addition, typical bot applications require that such home inventory information be manually input by a user and a search queried.

However, it would be advantageous to monitor and manage home inventory for a particular household, by a computer system that automatically performs comparison shopping between multiple on-line retailers for inventory needs of the particular household. In addition, it would be advantageous to automatically purchase products when cost effective product specials are provided by on-line retailers.

SUMMARY OF THE INVENTION

In view of the foregoing, it is therefore an object of the present invention to provide an improved electronic market system.

It is another object of the present invention to provide an improved method, system and program managing inventory purchases.

It is yet another object of the present invention to provide an improved method, system and program for maximizing cost and time efficiency for inventory purchases according to inventory needs.

In accordance with the present invention, absent items from an intended inventory are monitored at a computer system. Search requests for the absent items are automatically transmitted from the computer system to multiple independent product databases each respectively associated with one of multiple retailers. Offers are returned from multiple retailers to the computer system, such that inventory purchases for the particular household are managed by the computer system.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The present invention may be executed in a variety of systems, including a variety of computing systems and electronic devices under a number of different operating systems. In a preferred embodiment of the present invention, the computer system that incorporates communication features that provide for telephony, enhanced telephony, messaging and information services. Preferably, in order to enable at least one of these communication features, the computer system is able to be connected to a network, such as the Internet by either a wired link or wireless link. In addition, the computer system may be a stand-alone system or part of a network such as a local-area network (LAN) or a wide-area network (WAN). Therefore, in general, the present invention is preferably executed in a computer system that performs computing tasks such as manipulating data in storage that is accessible to the computer system. In addition, the computer system includes at least one output device and at least one input device.

Figure 1:
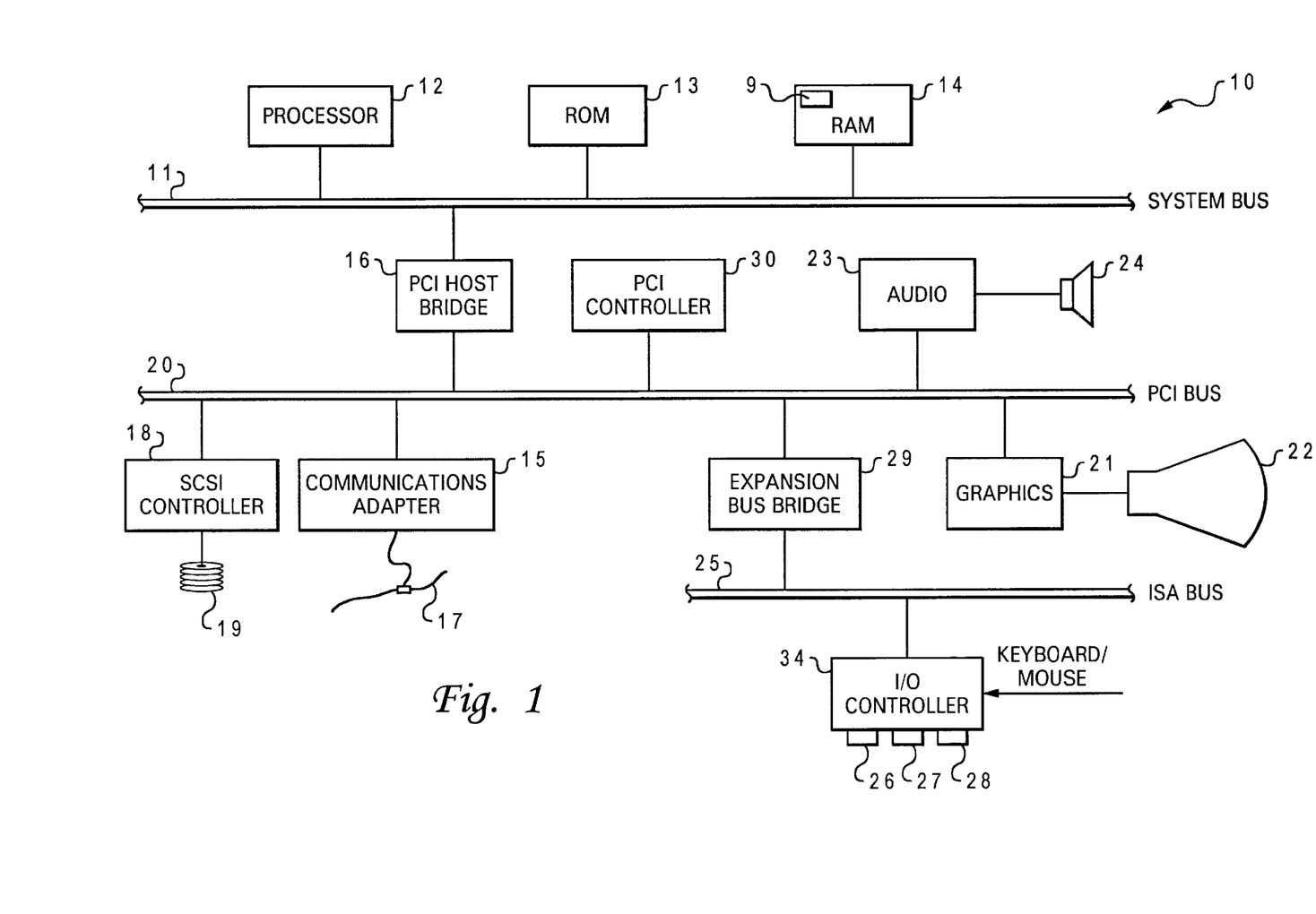
FIG. 1 depicts one embodiment of a data processing system with which the method, system and program of the present invention may advantageously be utilized.

Referring now to the drawings and in particular to FIG. 1, there is depicted a block diagram of one embodiment of a computer system that may utilize the present invention. As depicted, data processing system 10 includes at least one processor 12, which is coupled to system bus 11. Each processor 12 is a general-purpose processor, such as IBM's PowerPC™ processor that, during normal operation, processes data under the control of operating system and application software stored in random access memory (RAM) 14 and Read Only Memory (ROM) 13. The operating system preferably provides a graphical user interface (GUI) to the user. Application software contains instructions that when executed on processor 12 carry out the operations depicted in the flowcharts of FIGS. 5, 6, 7, 8 and others described herein.

Processors 12 are coupled via system bus 11 and Peripheral Component Interconnect (PCI) host bridge 16 to PCI local bus 20. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

PCI local bus 20 interconnects a number of devices for communication under the control of PCI controller 30. These devices include a Small Computer System Interface (SCSI) controller 18, which provides an interface to SCSI hard disk 19, and communications adapter(s) 15, which interface data processing system 10 to at least one data communication network 17 comprising wired and/or wireless network communications. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

PCI local bus 20 is further coupled to an Industry Standard Architecture (ISA) bus 25 by an expansion bus bridge 29. As shown, ISA bus 25 has an attached I/O (Input/Output) controller 34 that interfaces data processing system 10 to peripheral input devices such as a keyboard and mouse (not illustrated) and supports external communication via parallel, serial and universal serial bus (USB) ports 26, 27, and 28, respectively.

Figure 2:
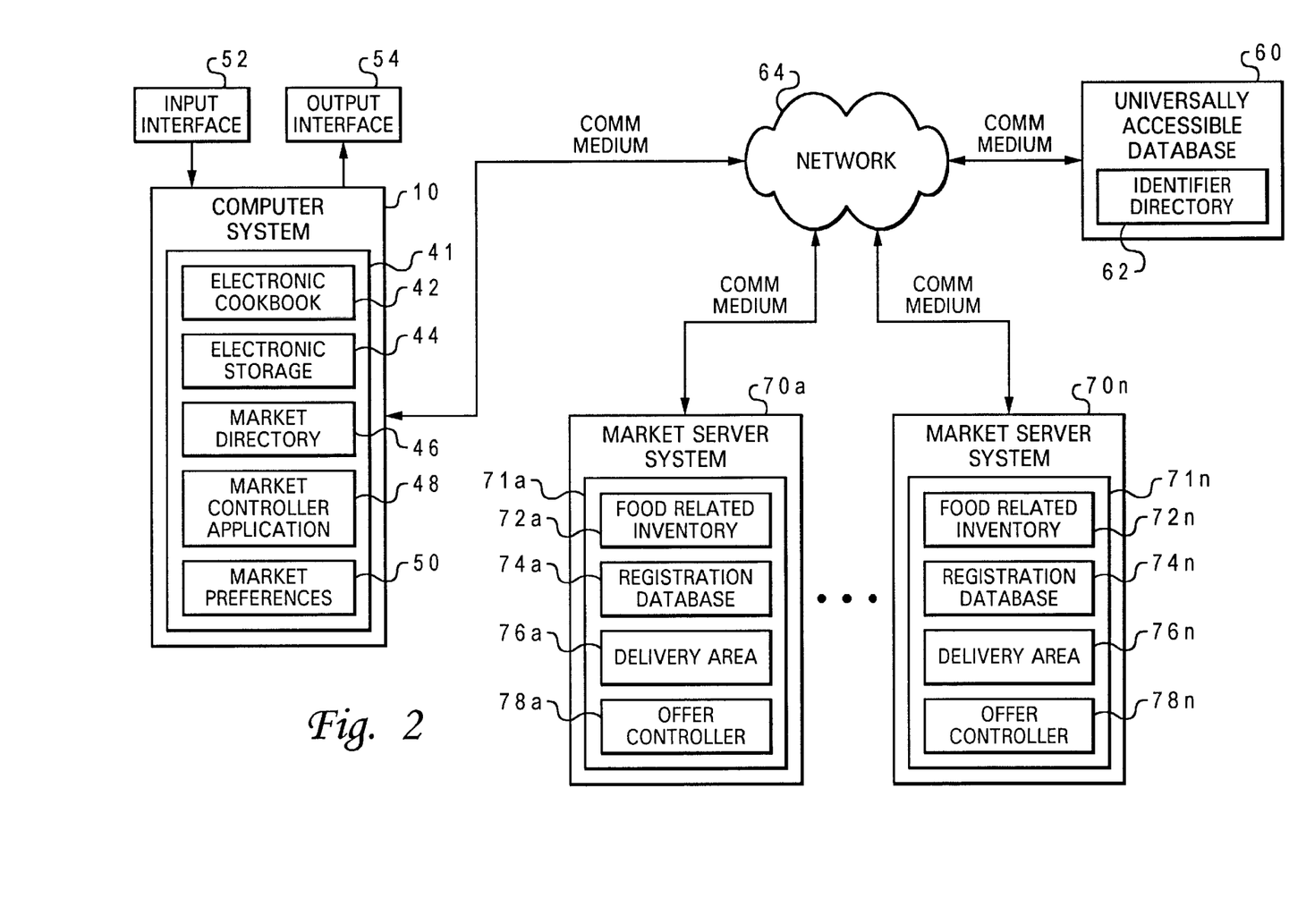
FIG. 2 illustrates one embodiment of a block diagram of an electronic market management system in accordance with the method, system, and program of the present invention.

With reference now to FIG. 2, there is illustrated a first embodiment of a block diagram of an electronic storage management system in accordance with the method, system, and program of the present invention. As depicted, computer system 10, universally accessible database 60, and market server systems 70a–70n each communicated via a bi-directional communications medium with a network 64, wherein network 64 is advantageously a universally accessible network, such as the Internet.

The communications medium may include wired or wireless communications or other communications media that enables bi-directional transmission of data. Moreover, the communications medium may include a link to a network, such as the Internet, or a direct data link.

Data exchange across the communications medium is advantageously performed in at least one of multiple available data transmission protocols and is preferably supported by a common data structure format, such as the extensible mark-up language (XML) data structure format. Data transmission protocols may include, but are not limited to, Transmission Control Protocol (TCP), Internet Protocol (IP), Hypertext Transfer Protocol (HTTP), and Bluetooth. In addition, data may be transmitted in a secure manner via encryption or by technologies, such as secure socket layer (SSL) or virtual private networks (VPN).

An example of an XML data file that might be transmitted from computer system 10 to any of market server systems 70a–70n, as depicted below, preferably contains data that is distinguished by attributes on elements and may be wrappered within a larger element. For example, the data attributed to element "<TimeStamp></TimeStamp>" designates the time that the data was attributed to the XML data file:

<PRODUCT SEARCH TimeStamp="888965153" UserID="georgeg.retro" Product="Pickles" Brand="BrandA" ProductAmount="12 oz, 64 oz"ScheduleRange="01.20.2000,01.30. 2000" BudgetRange="0.00,4.0011">

A second example of the same data in an alternate XML data format that includes elements is illustrated below:

<TimeStamp>888965153</TimeStamp>

<UserID>georgeg.retro</UserID>

<Product>Pickles</Product>

<Brand>BrandA</Brand>

<ProductAmount>12 oz, 64 oz</ProductAmount>

<ScheduleRange>01.20.2000, 01.30.2000</ScheduleRange>

<BudgetRange>0.00,4.00</BudgetRange>

In the example, computer system 10 transmits a product search request for a user with a universal identifier of "georgeg.retro". The search request is for the "brandA" of pickles ranging between 12 oz. and 64 oz. In addition, the pickles are needed by Jan. 30, 2000 and should be purchased for under $4.00.

In addition, in the example of the XML data format as the common transmittable data format, a data validation file such as a document type definition (DTD) or schema is preferably utilized to validate XML data files. In addition, a schema preferably translates multiple XML data files. Moreover, a style sheet such as an extensible style sheet language (XSL) file is preferably utilized to provide a style specification for the XML data at the receiving system. In particular, DTDs, schemas, and XSL files may be, for example, transmitted with an XML data file to a receiving system or downloaded at the receiving system from an alternate source. In the present example, the DTD or schema would verify that all the data required for a product search is included in the XML data file.

Computer system 10 may comprise systems including, but not limited to, a portable computer system, desktop computer system, server system, or other data processing system that is enabled to connect to network 64 and is advantageously accessible according to a particular universal identifier. Portable computer systems may include, but are not limited to, a palm-top computer, a mobile telephone, a personal digital assistant (PDA) and any pervasive device.

In addition, computer system 10 advantageously includes an input interface 52 for receiving user input and an output interface 54 for controlling output of data to a user. Input interface 52 may include input devices including, but not limited to, keyboards, keypads, mice, vocal recognition systems, touch-sensitive devices, etc. Output interface 54 may include output device including, but not limited to, display monitors, speakers, tactile-detectable devices, etc.

Computer system 10 advantageously includes an electronic cookbook 42, an electronic storage manager 44, a market directory 46, a market controller application 48, and market preferences 50 in a data storage medium 41. While in the present embodiment data storage medium 41 is depicted as internally accessible to computer system 10, in alternate embodiments data storage medium 41 may be externally or remotely accessible to computer system 10.

Electronic cookbook 42 advantageously includes meal plans with a preferred inventory of amounts of food and kitchen supplies for each of the meal plans. Meal plans and a preferred inventory may be determined for a household by electronic cookbook 42 as described in U.S. patent application Ser. No. 09/560,386, herein incorporated by reference.

In particular, electronic cookbook 42 includes a schedule for meal plans that designates when preferred inventory items are needed for preparing each meal plan. Moreover, electronic cookbook 42 includes a budget for food items to be utilized in preparing each meal plan and for additional kitchen supplies needed to prepare each meal plan.

Electronic storage 44 advantageously determines a selection of inventory items that are absent from storage within a particular household. Electronic storage 44 monitors current inventory and compares the preferred inventory determined by electronic cookbook 42 or other user preferences with the current inventory to determine the inventory items that are absent, as described in U.S. patent application Ser. No. 09/560,320, herein incorporated by reference. In particular, each of the selections of items that are absent from storage preferably includes a scheduled time by which the inventory item is preferred to be received at a household and a budgetary cap for the product. In addition, in the present invention electronic storage 44 advantageously monitors the amount of storage space available for new inventory.

Market directory 46 advantageously includes a database of universal identifiers for multiple on-line retailers. The multiple on-line retailers may be collected into market directory 46 according to criteria including, but not limited to, on-line retailers with store fronts accessible to a particular user, on-line retailers with specified food products, and on-line retailers with preferred shipping or home delivery.

Market preferences 50 advantageously includes a database of market preferences for multiple users of a household. For example, market preferences may include utilizing a particular market for particular types of purchases. For example a particular fish market may be designated for any fish purchases. In another example, market preferences may include particular items that should be purchased when specials are offered by any of market server systems 70a–70n. For example, during the winter time, anytime firewood is on sale at any of the market server systems for a particular price or less and forty bushels of firewood have not yet been purchased, an allowable amount of the firewood is automatically purchased. A market preference may be designated such that anytime a particular brand of soap is detected as advertised by an on-line retailer for less than thirty cents a bar, four bars of the particular brand of soap are purchased.

Other market preferences 50 may include preferences for particular brands that should not be substituted for alternate brands, even if budgetary preferences only allow for an alternate brand. Alternatively, market preferences 50 may include preferences for particular types of products where any brand may be purchased.

Market preferences 50 may be received from multiple occupants and visitors of a household from multiple types of data storage media. For example, a user may enter market preferences via input interface 52. A user may include market preferences on a portable computer system and transmit the market preferences from the portable computer system to computer system 10. In another example, a user may include market preferences on a personal storage device that is proffered by the user at computer system 10. In yet another example, a user may enter a universal identifier at computer system 10 for a remote server system that comprises the market preferences for the particular user.

Market controller application 48 coordinates purchasing each of the selections of items that are absent from storage according to amount preferences, scheduling preferences and budgetary preferences. In particular, in response to determining a particular retailer from which an item is to be purchased, transmittal of registration data and payment authorization to a particular on-line retailer is controlled by market controller application 48 in a common data format, such as XML.

Market controller application 48 may first determine whether or not any of market preferences 50 apply to any of the selections of items that are absent from storage. For example, if a particular brand of fine chocolate is absent from storage and a market preference indicates that a particular on-line retailer should be utilized for purchasing any fine chocolates, then market controller application 48 would specify purchasing the particular brand of fine chocolate from the particular on-line retailer.

However, market controller application 48 would also transmit a search request in the common transmittable data format, such as XML, to the particular on-line retailer to determine the availability and price of the particular brand of fine chocolates. If the fine chocolates are not available within a particular scheduling range or within a budget range, the user would advantageously be provided an opportunity to override either of the ranges or to request a search for the particular brand of fine chocolates at other on-line retailers.

If a specific retailer is not designated for an absent inventory item, then a search request including the item, brand preferences, quantity preferences, schedule preferences, and budget preferences is transmitted by market controller application 48 in the common transmittable data format to the multiple on-line retailers included in market directory 46 for the absent inventory item. In particular, market controller application 48 transmits universal identifiers, that are alphanumeric identifiers such as web page identifiers, for the on-line retailers with the search request to universally accessible database 60 via network 64. Each of the universal identifiers is looked up in an identifier directory 62 that includes a network address for a market server system from among market server systems 70a–70n that is respectively associated with each of the multiple universal identifiers. In particular, universally accessible database is advantageously included within at least one server system that is universally accessible via network 64. In addition, in particular, market server systems 70a–70n may include, but are not limited to including, systems such as network servers, web application servers, mainframes and home computer systems.

Product offers received from market server systems 70a–70n, in response to a particular search request, may be compared by market controller application 48 with multiple criteria including amounts, scheduling, budget and delivery options to determine which retailer provides the best offer. In addition, in comparing multiple product offers, if a particular product is under-budget and another is over-budget, market controller application may recommend the over-budget product as compensated for by the under-budget item. In particular, a shopping list of recommended purchases is determined and output to output interface 54 where a preferred selection of products are graphically distinguished.

For example if multiple retailers are searched for a particular brand of detergent and a selection of the retailers return product offers for the particular brand of detergent, then each of the product offers would be compared according to a user schedule and cost. For example, a particular user has scheduled to go to a particular store front and the on-line retailer associated with the store front returns an offer for the detergent at $6.00. Another offer from an on-line retailer that offers delivery for 10% of the item cost offers the detergent at $5.90, such that the effective cost is $6.49. In this case, market controller application 48 might recommend that the user pick up the detergent at the store since the user has already schedule to go to the store and the detergent costs less at the store. However, if the user did not have time scheduled to go to the store, market controller application 48 might recommend purchasing from the on-line retailer that offers delivery.

In addition, market controller application 48 polls on-line retailers included in market directory 46 at a periodic rate for specials and compares the specials with market preferences 50 to determine if any automatic buys are included. For example, if toilet paper is designated in market preferences 50 as an automatic purchase when each roll is less than thirty cents, then specials returned from multiple polled on-line retailers would be filtered for any specials for toilet paper where each roll is less than thirty cents. A user may also select an option where the user is provided an option to purchase any specials retrieved in polling the on-line retailers. In addition, market controller application 48 may determine from electronic storage 44 whether or not there is storage space available for a particular item that has been designated for an automatic purchase.

Market server systems 70a–70n advantageously respectively include food-related inventories 72a–72n, registration databases 74a–74n, delivery areas 76a–76n, and offer controllers 78a–78n within data storage mediums 71a–71n. While in the present embodiment data storage mediums 71a–71n are depicted as being internally accessible to market server systems 70a–70n, in alternate embodiments data storage mediums 71a–71n may be externally or remotely accessible to market server systems 70a–70n.

Food-related inventories 72a–72n each include inventories of types of items, brands of items, amounts of items, prices of items, and a schedule availability of items for a particular on-line retailer. In addition, items in food-related inventories 72a–72n may be designated as on-sale or special for a particular time period. Food-related inventories 72a–72n are advantageously searchable according to search requests received from computer system 10 and other computer systems with access to network 64.

Registration databases 74a–74n advantageously include registration data for multiple consumers. Registration data may include a universal identifier or login name associated with each consumer, a mailing address, telephone number and payment data. A particular retailer may require that a user be registered to search a food-related inventory. Alternatively, a particular retailer may require that a user only be registered to purchase from a food-related inventory.

Delivery areas 76a–76n designate areas in which on-line retailers may provide home delivery of items purchased from the on-line retailer. Market server systems 70a–70n may also provide for shipping items and for picking up pre-bagged items at a store location according to an on-line order.

Offer controllers 78a–78n advantageously receive search requests from computer system 10 and other computer systems and return a selection of items that meet a search request. In particular, offer controllers 78a–78n filter food-related inventory databases according to each element within a search request. For example, in receiving a search request for brand A pickles under $4.00 in a 12 oz to 64 oz. jar, offer controllers 78a–78n would filter first for pickles in general to determine a selection of offers. Next, the general pickles order is filtered according to all other preferences such as brand, price and amount. If a product offer is not available after filtering according to all other preferences, then the general pickle orders are filtered according to each preference individually. For example, the general pickle orders are filtered according to brand and a selection of pickle orders for the brand are selected for transmittal to the requesting system.

In addition, offer controllers 78a–78n may monitor the types of requests being received and adjust prices in response to the requests. In response to receiving an order for items, offer controllers 78a–78n control processing of the order according to the offer provided to the user.

It is important to note that while the present invention is described with reference to inventory including food and kitchen supplies, other types of inventory within a household may be monitored and managed by the present invention including, but not limited to, toiletries, car supplies, garden supplies, cleaning supplies and other supplies that are typically included within the inventory of a particular household or are intended to be in inventory for future use.

Figure 3:
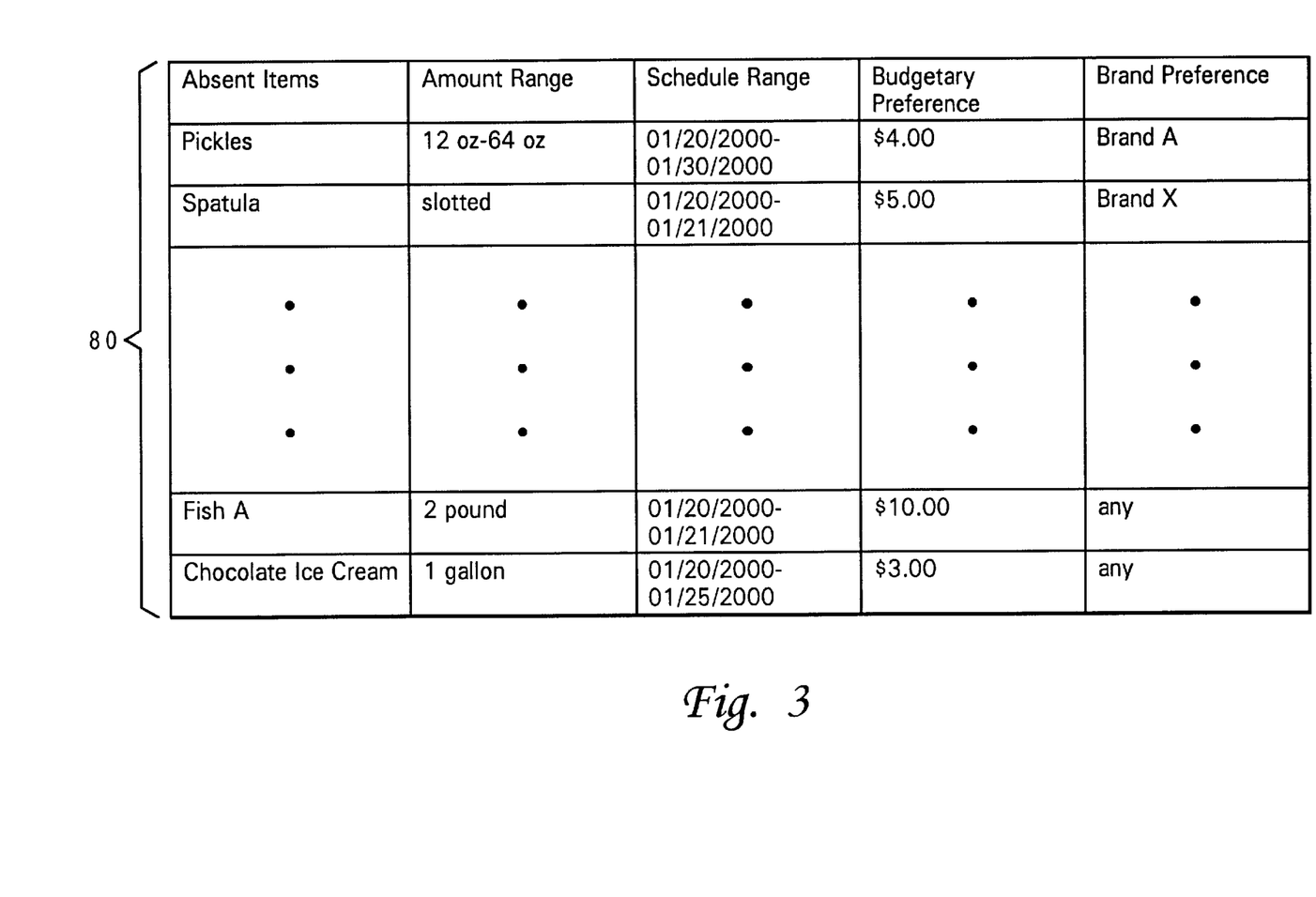
FIG. 3 depicts a pictorial illustration of data storage structure for a selection of items absent from an intended inventory of a household in accordance with the method, system and program of the present invention.

With reference now to FIG. 3, there is depicted a pictorial illustration of data storage structure for a selection of items absent from an intended inventory of a household in accordance with the method, system and program of the present invention. As illustrated, a data storage structure 80 advantageously includes multiple elements that are translatable into an XML data file.

In the example, between a 12 oz. and 64 oz. jar of pickles by "BrandA" is absent and needs be added to inventory between Jan. 20, 2000 and Jan. 30, 2000 for under $4.00. A slotted spatula by "BrandX" is absent and needs to be added to inventory between Jan. 20, 2000 and Jan. 21, 2000 for under $5.00. Two pounds of fishA need to be added to inventory between Jan. 20, 2000 and Jan. 21, 2000 for under $10.00. In particular, scheduled dates for items such as fish are imperative in order to utilize the fish prior to spoiling. In addition, the example includes one gallon of any brand of chocolate ice cream that is $3.00 or less.

Figure 4:
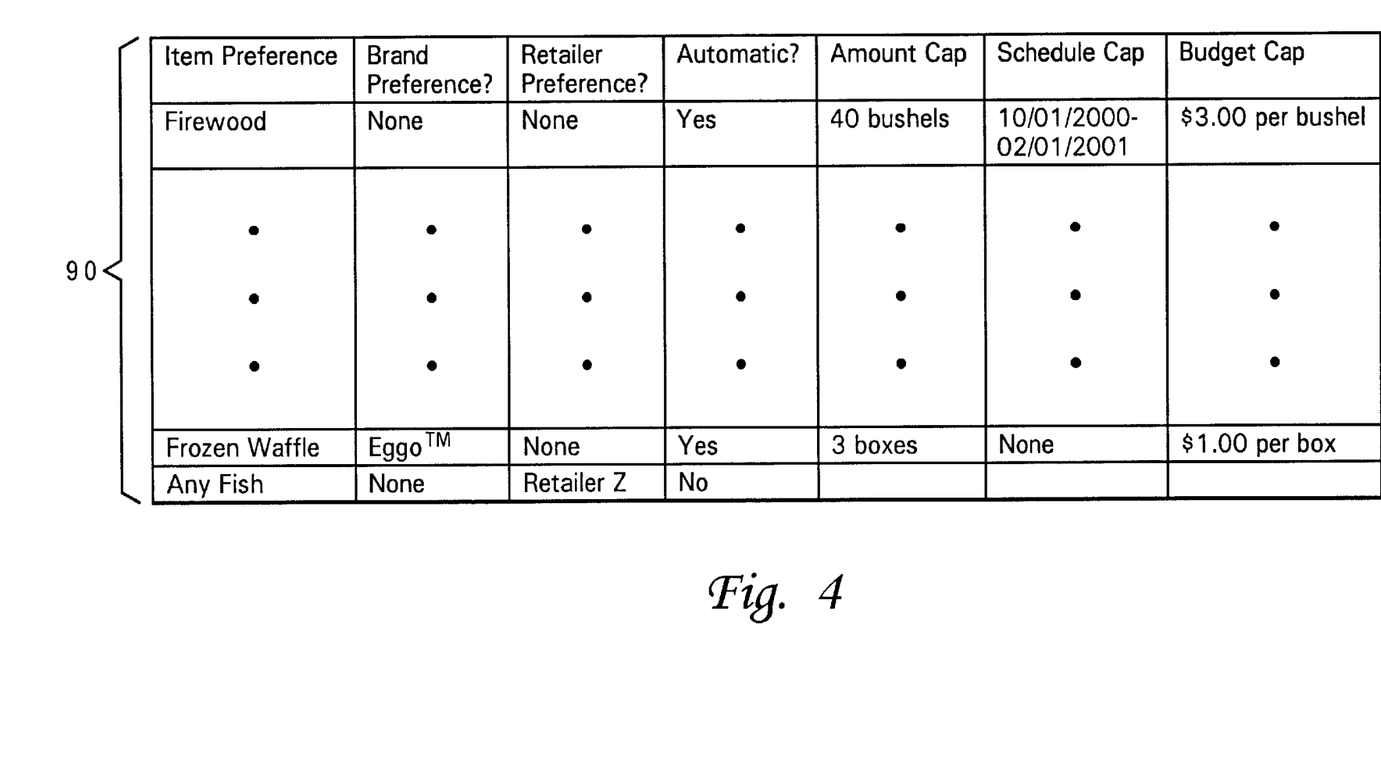
FIG. 4 illustrates a pictorial illustration of a data storage structure for product preferences for a household in accordance with the method, system and program of the present invention.

Referring now to FIG. 4, there is illustrated a pictorial illustration of a data storage structure for product preferences for a household in accordance with the method, system and program of the present invention. As illustrated, a data storage structure 90 advantageously includes multiple elements that are translatable into an XML data file.

In the example, an item preference for firewood is listed for as an automatic purchase up to 40 bushels between Oct. 10, 2000 and Feb. 10, 2001 for under $3.00 a bushel. In addition, frozen waffles are depicted as an automatic purchase up to three boxes for the brand Eggo™ (Eggo is a trademark of Kellogg, Inc.) when less than or equal to $1.00 per box. In addition, in the example, a preference is illustrated for any fish purchases to be made from retailer Z.

Figure 5A:
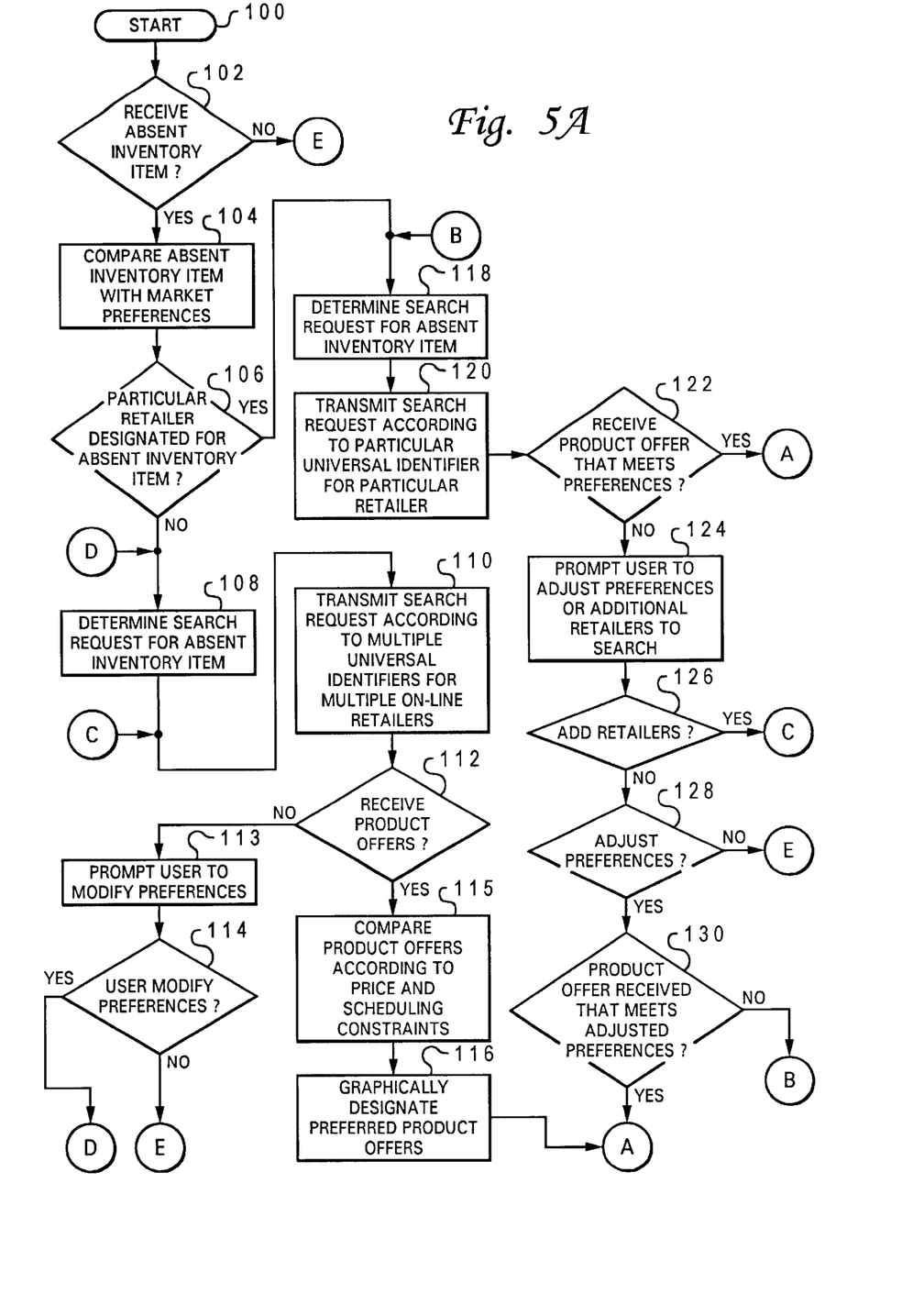
FIG. 5 depicts a high level logic flowchart of a process and program for managing an electronic market system for a household in accordance with the present invention.

With reference now to FIG. 5, there is depicted a high level logic flowchart of a process and program for managing an electronic market system for a household in accordance with the present invention. As illustrated, the process starts at block 100 and thereafter proceeds to block 102. Block 102 depicts a determination as to whether or not absent inventory items are received. If absent inventory items are not received, then the process ends. If absent inventory items are received, then the process passes to block 104. Block 104 illustrates comparing the absent inventory item with market preferences. Next, block 106 depicts a determination as to whether or not a particular retailer is designated for any of the absent inventory items. If a particular retailer is not designated, then the process passes to block 108. If a particular retailer is designated, then the process passes to block 118.

Block 118 depicts determining a search request for the absent inventory item including any brand preferences, scheduling preferences and budget preferences. Next, block 120 illustrates transmitting the search request according to the particular universal identifier for the particular retailer. Thereafter, block 122 depicts a determination as to whether or not a product offer is returned from a retailer that meets preferences. If a product offer is returned from a retailer that meets preferences, then the process passes to block 132. If a product offer is not returned that meets preferences, then the process passes to block 124.

Block 124 illustrates prompting the user to adjust preferences or add additional retailers to the search. Next, block 126 depicts a determination as to whether or not additional retailers are added. If additional retailers are added, then the process passes to block 110. If additional retailers are not added, then the process passes to block 128.

Block 128 illustrates a determination as to whether or not preferences are adjusted. If preferences are not adjusted, then the process ends. If preferences are adjusted, then the process passes to block 130. Block 130 depicts a determination as to whether or not a product offer is already received from a retailer that meets the adjusted preferences. If a product offer is already received that meets the adjusted preferences, then the process passes to block 132. If a product offer is not already received that meets the adjusted preferences, then the process passes to block 118.

Block 108 depicts determining a search request for absent inventory items including any brand preferences, scheduling preferences and budget preferences. Next, block 110 illustrates transmitting the search request according to multiple universal identifiers for multiple on-line retailers. Thereafter, block 112 depicts a determination as to whether or not product offers are received. If product offers are received, then the process passes to block 115. If product offers are not received, then the process passes to block 113.

Block 113 depicts prompting the user to modify preferences. Next, block 114 illustrates a determination as to whether or not the user has modified the preferences. If the user has not modified preferences, then the process ends. If the user has modified preferences, then the process passes to block 108.

Block 115 illustrates comparing the product offers according to price and schedule constraints. Next, block 116 depicts graphically designating preferred product offers at an output interface; and the process passes to block 132.

Block 132 illustrates a determination as to whether or not a user has selected to purchase from a particular on-line retailer from a particular product offer. If a user has not selected to purchase, then the process ends. If a user has selected to purchase, then the process passes to block 134. Block 134 depicts transmitting an order request for the product offer item to the providing on-line retailer according to the universal identifier for the particular on-line retailer; and the process ends.

Figures 5B, 6:
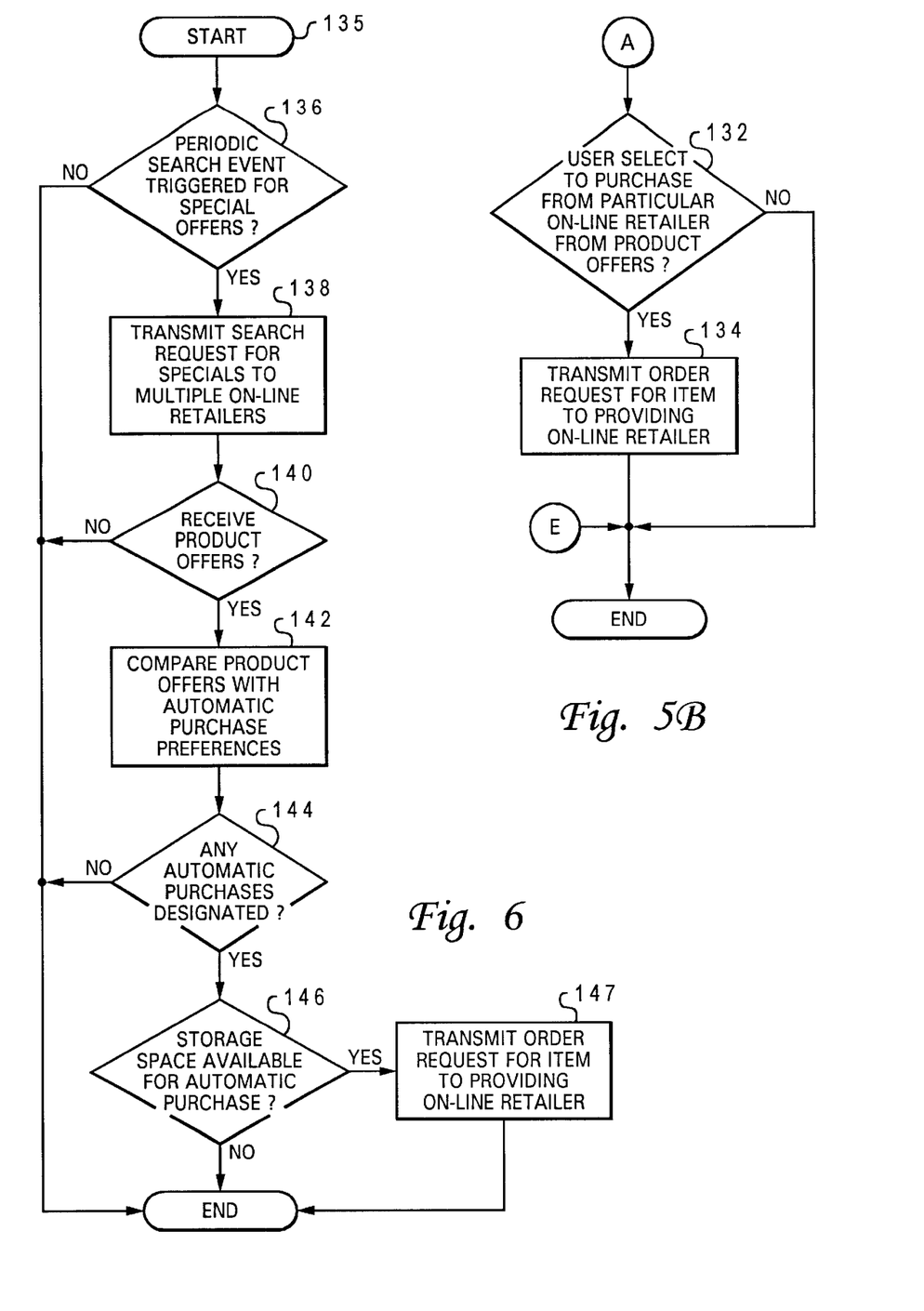
FIG. 6 illustrates a high level logic flowchart of a process and program for managing automatic purchases for a household in accordance with the present invention.

Referring now to FIG. 6, there is illustrated a high level logic flowchart of a process and program for managing automatic purchases for a household in accordance with the present invention. As depicted, the process starts at block 135 and thereafter proceeds to block 136. Block 136 depicts a determination as to whether or not a periodic search event is triggered. If a periodic search event is not triggered, then the process ends. If a periodic search event is triggered, then the process passes to block 138. Block 138 illustrates transmitting a search request for specials to multiple on-line retailers according to the multiple universal identifiers associated with the multiple on-line retailers. Next, block 140 depicts a determination as to whether or not product offers are received. If product offers are not received, then the process ends. If product offers are received, then the process passes to block 142.

Block 142 illustrates comparing the product offers with market preferences in order to determine if there are any automatic purchases. In addition, product offers for similar products may be compared to determine which offer is better. Next, block 144 depicts a determination as to whether or not any automatic purchases are designated for the product offers. If no automatic purchases are designated for the product offers, then the process ends. If automatic purchases are designated for the product offers, then the process passes to block 146. Block 146 illustrates a determination as to whether or not there is storage space available for the automatic purchases. If there is not any storage space available, then the process ends. If there is storage space available, then the process passes to block 147. Block 147 depicts transmitting an order request for the item to the providing on-line retailer; and the process ends.

Figure 7:
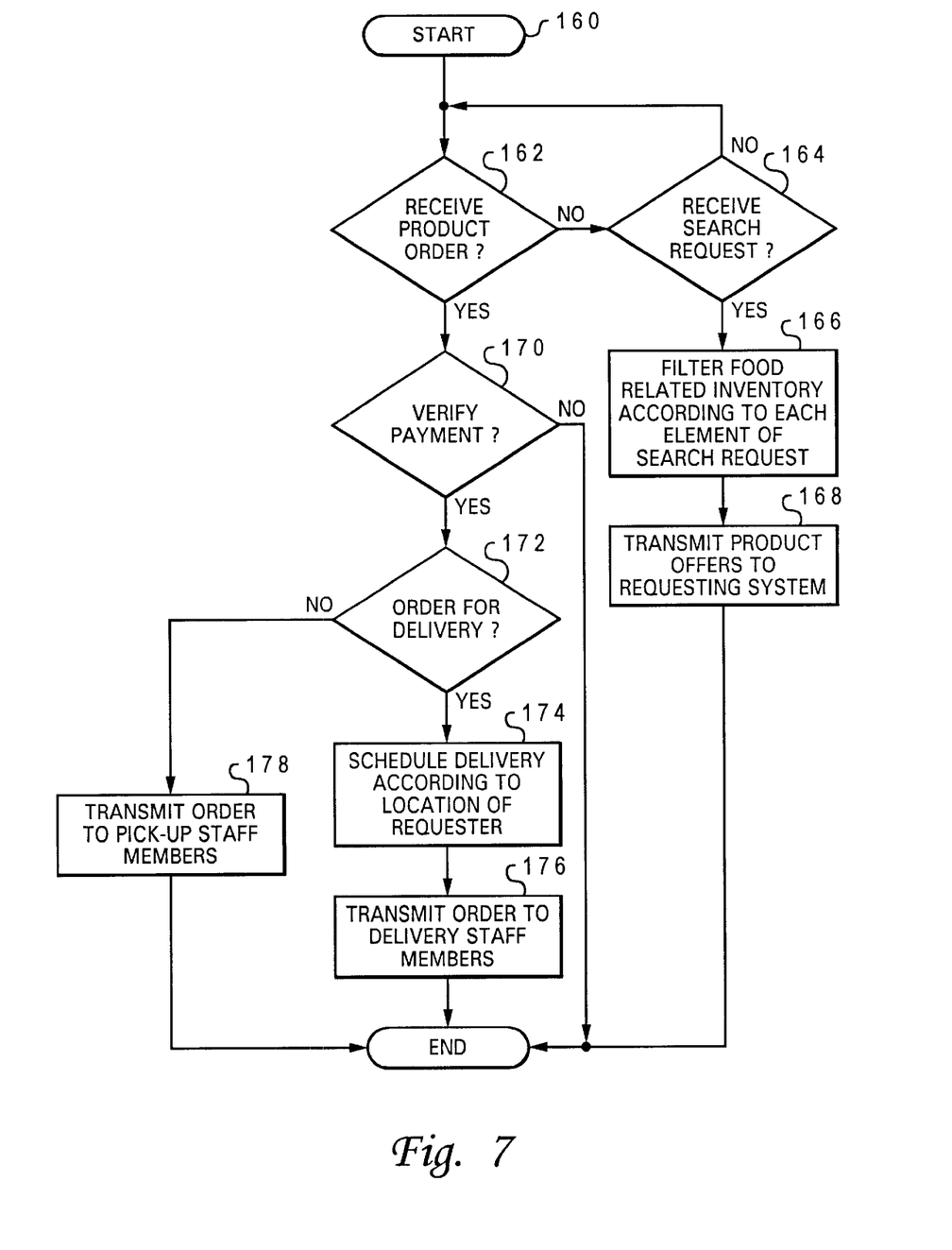
FIG. 7 depicts a high level logic flowchart of a process and program for managing search queries from an electronic market system in accordance with the present invention.

Referring now to FIG. 7, there is illustrated a high level logic flowchart of a process and program for managing search queries from an electronic market system in accordance with the present invention. As depicted, the process starts at block 160 and thereafter proceeds to block 162. Block 162 illustrates a determination as to whether or not a product order is received. If a product order is received, then the process passes to block 170. If a product order is not received, then the process passes to block 164.

Block 170 depicts a determination of whether or not the payment is verified. If the payment is not verified, then the process ends. If the payment is verified, then the process passes to block 172. Block 172 illustrates a determination as to whether or not the order is requested for delivery. If the order is not requested for delivery, then the process passes to block 178. Block 178 depicts transmitting the order to an output interface accessible to the pick-up staff members; and the process ends. If the order is requested for delivery, then the process passes to block 174. Block 174 illustrates scheduling delivery according to location of the requester. Next, block 176 depicts transmitting the order to an output interface accessible to the delivery staff members; and the process ends.

Block 164 illustrates a determination as to whether or not a search request is received. If a search request is not received, then the process passes to block 162. If a search request is received, then the process passes to block 166. Block 166 depicts filtering the food related inventory of the on-line retailer according to each element of the search request for a particular item. Next, block 168 illustrates transmitting the product offers to the requesting system; and the process ends.

Figure 8:
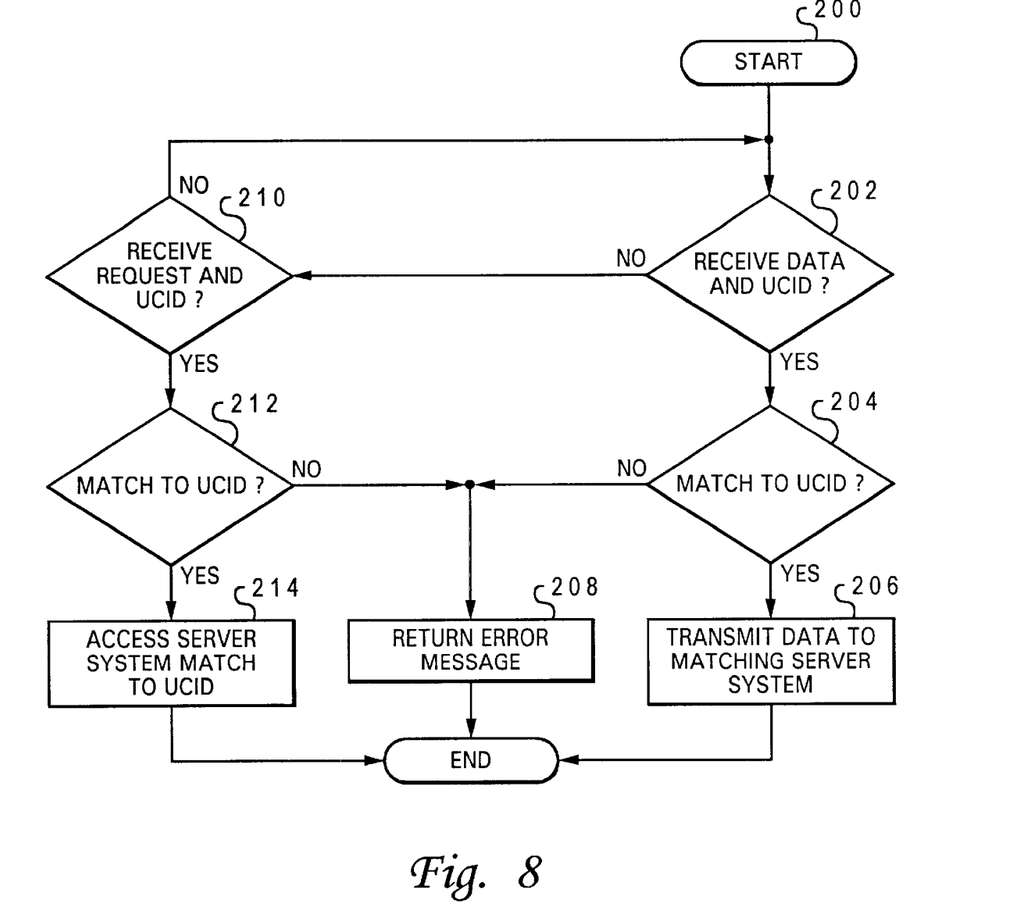
FIG. 8 illustrates a high level logic flowchart of a process and program for controlling access to a universally accessible server system via a universally accessible database in accordance with the present invention.

With reference now to FIG. 8, there is illustrated a high level logic flowchart of a process and program for controlling access to a universally accessible server system via a universally accessible database in accordance with the present invention. As illustrated, the process starts at block 200 and thereafter proceeds to block 202. Block 202 depicts a determination as to whether or not data and a universal communications identifier (UCID) are received at a universally accessible database. If data and a UCID are not received, then the process passes to block 210. If data and a UCID are received, then the process passes to block 204. Block 204 illustrates a determination as to whether or not a match to the UCID is found in the UCID directory of the universally accessible database. If a match is not found, then the process passes to block 208. Block 208 depicts returning an error message; and the process ends. If a match is found, then the process passes to block 206. Block 206 illustrates transmitting the data to the address of the matching universally accessible remote server system; and the process ends.

Block 210 depicts a determination as to whether or not a request for data and a UCID are received at the universally accessible database. If a request for data and UCID are not received, then the process passes to block 202. If a request for data and UCID are received, then the process passes to block 212. Block 212 illustrates a determination as to whether or not a match to the UCID is found in the UCID directory of the universally accessible database. If a match is not found, then the process passes to block 208. If a match is found, then the process passes to block 214. Block 214 depicts accessing the universally accessible remote server system at a server address associated with the matched UCID; and the process ends.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for managing inventory purchases, said method comprising the steps of:
   receiving a meal plan having at least one meal associated with a designated time, said meal plan including items necessary for preparing said at least one meal;
   monitoring, at a computer system, a current inventory;
   determining whether said items of said received meal plan are absent from said current inventory;
   automatically transmitting search requests for said absent items from said computer system, based on stored user preferences and based on when said absent items are to be received for use in preparing said least one said meal at said designated time, to a plurality of independent product databases each respectively associated with one of a plurality of retailers; and
   automatically transmitting a purchase request to a particular retailer based on a result of said search requests, such that inventory purchases are managed by said computer system.

2. The method for managing inventory purchases according to claim 1, said step of automatically transmitting search requests for said absent items based on user preferences from said computer system to a plurality of independent product databases each respectively associated with one of a plurality of retailers, further comprising the steps of:
   comparing said absent items with user preferences for at least one user; and
   transmitting a search request for a particular absent item to a particular retailer, in response to determining that said user preferences include said particular retailer from which purchase of said particular absent item is preferred.

3. The method for managing inventory purchases according to claim 1, said step of automatically transmitting search requests for said absent items based on user preferences from said computer system to a plurality of independent product databases each respectively associated with one of a plurality of retailers, further comprising the step of:
   transmitting said search requests for said absent items including any brand preferences, schedule preferences, and budget preferences included in said user preferences.

4. The method for managing inventory purchases according to claim 1, said step of automatically transmitting search requests for said absent items based on user preferences from said computer system to a plurality of independent product databases each respectively associated with one of a plurality of retailers, further comprising the step of:
   automatically transmitting search requests in an extensible mark-up language data format.

5. The method for managing inventory purchases according to claim 1, said step of automatically transmitting search requests for said absent items based on user preferences from said computer system to a plurality of independent product databases each respectively associated with one of a plurality of retailers, further comprising the step of:
   transmitting search requests to a plurality of on-line retailers included in a directory of on-line retailers sorted according to types of products and services offered.

6. The method for managing inventory purchases according to claim 1, said step of automatically transmitting search requests for said absent items based on user preferences from said computer system to a plurality of independent product databases each respectively associated with one of a plurality of retailers, further comprising the step of:
   transmitting said search requests for said absent items to a universally accessible database according to a plurality of universal identifiers, wherein each of said plurality of universal identifier is associated with one of said plurality of retailers.

7. The method for managing inventory purchases according to claim 1, said method further comprising the step of:
   constructing a recommended electronic shopping list comprising said absent items from a selection of offers returned from said plurality of retailers at said computer system.

8. The method for managing inventory purchases according to claim 7, said step of constructing a recommended electronic shopping list comprising said absent items from a selection of offers returned from said plurality of retailers at said computer system, further comprising the step of:

constructing said recommended electronic shopping list comprising said absent items from said selection of offers returned from said plurality of retailers according to user preferences for a particular household.

9. The method for managing inventory purchases according to claim 8, said step of constructing a recommended electronic shopping list comprising said absent items from a selection of offers returned from said plurality of retailers at said computer system, further comprising the step of:

constructing said recommended electronic shopping list comprising absent items according to scheduling constraints for a particular household.

10. The method for managing inventory purchases according to claim 7, said method further comprising the step of:

transmitting orders for said absent items to said selection of said plurality of retailers, in response to receiving a user designation to purchase from said recommended electronic shopping list.

11. The method for managing inventory purchases according to claim 1, said method further comprising the steps of:

periodically transmitting search requests to said plurality of retailers for current specials offered by said plurality of retailers;

determining if any of said special product offers include items that are designated in user preferences for automatic purchase, in response to receiving special product offers; and     transmitting an order for a particular special product offer from a particular retailer, in response to determining that said particular special product order is designated in said user preferences for automatic purchase.

12. The method of claim 1, wherein said absent items are delivered by said particular retailer.

13. The method of claim 1, further comprising the step of:

scheduling a pick-up of said absent items by an ordering party of said absent items.

14. The method of claim 1, wherein said meal plan is received from an electronic cookbook.

15. A system for managing inventory purchases, said system comprising:

means for receiving a meal plan having at least one meal associated with a designated time, said meal plan including items necessary for preparing said at least one meal;

means for monitoring, at a computer system, a current inventory;

means for determining whether said items of said received meal plan are absent from said current inventory; and     means for automatically transmitting search requests for said absent items from said computer system, based on stored user preferences and based on when said absent items are to be received for use in preparing said at least one said meal at said designated time, to a plurality of independent product databases each respectively associated with one of a plurality of retailers; and     means for automatically transmitting a purchase request to a particular retailer based on a result of said search requests, such that inventory purchases are managed by said computer system.

16. The system for managing inventory purchases according to claim 15, said means for automatically transmitting search requests for said absent items based on user preferences from said computer system to a plurality of independent product databases each respectively associated with one of a plurality of retailers, further comprising:

means for comparing said absent items with user preferences for at least one user; and     means for transmitting a search request for a particular absent item to a particular retailer, in response to determining that said user preferences include said particular retailer from which purchase of said particular absent item is preferred.

17. The system for managing inventory purchases according to claim 15, said means for automatically transmitting search requests for said absent items based on user preferences from said computer system to a plurality of independent product databases each respectively associated with one of a plurality of retailers, further comprising:

means for transmitting said search requests for said absent items including any brand preferences, schedule preferences, and budget preferences included in said user preferences.

18. The system for managing inventory purchases according to claim 15, said means for automatically transmitting search requests for said absent items based on user preferences from said computer system to a plurality of independent product databases each respectively associated with one of a plurality of retailers, further comprising:

means for automatically transmitting search requests in an extensible mark-up language data format.

19. The system for managing inventory purchases according to claim 15, said means for automatically transmitting search requests for said absent items based on user preferences from said computer system to a plurality of independent product databases each respectively associated with one of a plurality of retailers, further comprising:

means for transmitting search requests to a plurality of on-line retailers included in a directory of on-line retailers sorted according to types of products and services offered.

20. The system for managing inventory purchases according to claim 15, said means for automatically transmitting search requests for said absent items based on user preferences from said computer system to a plurality of independent product databases each respectively associated with one of a plurality of retailers, further comprising:

means for transmitting said search requests for said absent items to a universally accessible database according to a plurality of universal identifiers, wherein each of said plurality of universal identifier is associated with one of said plurality of retailers.

21. The system for managing inventory purchases according to claim 15, said system further comprising:

means for constructing a recommended electronic shopping list comprising said absent items from a selection of offers returned from said plurality of retailers at said computer system.

22. The system for managing inventory purchases according to claim 21, said means for constructing a recommended electronic shopping list comprising said absent items from a selection of offers returned from said plurality of retailers at said computer system, further comprising:

means for constructing said recommended electronic shopping list comprising said absent items from said selection of offers returned from said plurality of retailers according to user preferences for a particular household.

23. The system for managing inventory purchases according to claim 22, said means for constructing a recommended electronic shopping list comprising said absent items from a selection of offers returned from said plurality of retailers at said computer system, further comprising:
  means for constructing said recommended electronic shopping list comprising absent items according to scheduling constraints for a particular household.

24. The system for managing inventory purchases according to claim 21, said system further comprising:
  means for transmitting orders for said absent items to said selection of said plurality of retailers, in response to receiving a user designation to purchase from said recommended electronic shopping list.

25. The system for managing inventory purchases according to claim 15, said system further comprising:
  means for periodically transmitting search requests to said plurality of retailers for current specials offered by said plurality of retailers;
  means for determining if any of said special product offers include items that are designated in user preferences for automatic purchase, in response to receiving special product offers; and
  means for transmitting an order for a particular special product offer from a particular retailer, in response to determining that said particular special product order is designated in said user preferences for automatic purchase.

26. The system of claim 15, wherein said absent items are delivered by said particular retailer.

27. The system of claim 15, further comprising:
  means for scheduling a pick-up of said absent items by an ordering party of said absent items.

28. The system of claim 15, wherein said meal plan is received from an electronic cookbook.

29. A computer program for managing inventory purchases, residing on a computer usable medium having computer readable program code means, said computer program comprising:
  program code means for receiving a meal plan having at least one meal associated with a designated time, said meal plan including items necessary for preparing said at least one meal;
  program code means for monitoring, at a computer system, a current inventory;
  program code means for determining whether said items of said received meal plan are absent from said current inventory;
  program code means for automatically transmitting search requests for said absent items from said computer system, based on stored user preferences and based on when said absent items are to received for use in preparing said at least one said meal at said designated time, to a plurality of independent product databases each respectively associated with one of a plurality of retailers; and
  program code means for automatically transmitting a purchase request to a particular retailer based on a result of said search requests, such that inventory purchases are managed by said computer system.

30. The program for managing inventory purchases according to claim 29, said program further comprising:
  program code means for comparing said absent items with user preferences for at least one user; and
  program code means for transmitting a search request for a particular absent item to a particular retailer, in response to determining that said user preferences include said particular retailer from which purchase of said particular absent item is preferred.

31. The program for managing inventory purchases according to claim 29, said program further comprising:
  program code means for transmitting said search requests for said absent items including any brand preferences, schedule preferences, and budget preferences included in said user preferences.

32. The program for managing inventory purchases according to claim 29, said program further comprising:
  program code means for automatically transmitting search requests in an extensible mark-up language data format.

33. The program for managing inventory purchases according to claim 29, said program further comprising:
  program code means for transmitting search requests to a plurality of on-line retailers included in a directory of on-line retailers sorted according to types of products and services offered.

34. The program for managing inventory purchases according to claim 29, said program further comprising:
  program code means for transmitting said search requests for said absent items to a universally accessible database according to a plurality of universal identifiers, wherein each of said plurality of universal identifier is associated with one of said plurality of retailers.

35. The program for managing inventory purchases according to claim 29, said program further comprising:
  program code means for constructing a recommended electronic shopping list comprising said absent items from a selection of offers returned from said plurality of retailers at said computer system.

36. The program for managing inventory purchases according to claim 35, said program further comprising:
  program code means for constructing said recommended electronic shopping list comprising said absent items from said selection of offers returned from said plurality of retailers according to user preferences for a particular household.

37. The program for managing inventory purchases according to claim 36, said program further comprising:
  program code means for constructing said recommended electronic shopping list comprising absent items according to scheduling constraints for a particular household.

38. The program for managing inventory purchases according to claim 35, said program further comprising:
  program code means for transmitting orders for said absent items to said selection of said plurality of retailers, in response to receiving a user designation to purchase from said recommended electronic shopping list.

39. The program for managing inventory purchases according to claim 29, said program further comprising:
  program code means for periodically transmitting search requests to said plurality of retailers for current specials offered by said plurality of retailers;
  program code means for determining if any of said special product offers include items that are designated in user preferences for automatic purchase, in response to receiving special product offers; and
  program code means for transmitting an order for a particular special product offer from a particular retailer, in response to determining that said particular special product order is designated in said user preferences for automatic purchase.

40. The program for managing inventory purchases according to claim 29, wherein said absent items are delivered by said particular retailer.

41. The program for managing inventory purchases according to claim 29, said program further comprising:

program code means for scheduling a pick-up of said absent items by an ordering party of said absent items.

42. The program for managing inventory purchases according to claim 29, wherein said meal plan is received from an electronic cookbook.

* * * * *

Disclaimer

6,430,541—Michael Wayne Brown, Georgetown; Kelvin Roderick Lawrence; Michael A. Paolini, both of Round Rock, all of TX (US). MANAGING INVENTORY PURCHASES Patent dated Aug. 6, 2002. Disclaimer filed Oct. 4, 2006, by the assignee, International Business Machines Corporation.

Hereby enters this disclaimer to all claims, of said patent.

*(Official Gazette, January 9, 2007)*